US009086281B1

(12) United States Patent  (10) Patent No.: US 9,086,281 B1
Thiagarajan et al.  (45) Date of Patent: Jul. 21, 2015

(54) USING ACCELEROMETER DATA TO DETERMINE MOVEMENT DIRECTION

(71) Applicant: AMAZON TECHNOLOGIES, INC., Reno, NV (US)

(72) Inventors: Arvind Thiagarajan, Mountain View, CA (US); James Joseph Wolfe, Los Gatos, CA (US); Anand Balakrishnan, Santa Clara, CA (US)

(73) Assignee: Amazon Technologies, Reno, NV (US)

( * ) Notice: Subject to any disclaimer, the term of this patent is extended or adjusted under 35 U.S.C. 154(b) by 86 days.

(21) Appl. No.: 13/898,635

(22) Filed: May 21, 2013

(51) Int. Cl.
*G01C 21/26* (2006.01)
*G01C 21/32* (2006.01)
*G01C 21/10* (2006.01)

(52) U.S. Cl.
CPC ..................................... *G01C 21/10* (2013.01)

(58) Field of Classification Search
CPC ..... H04W 16/28; H04W 24/08; H04W 64/00; H04W 84/18; G06F 17/00; G06F 15/00; G06F 15/177; G06F 19/10; A61B 17/0206; A61B 17/00; A61B 17/16; A61B 5/01; A61B 5/08; A61B 5/682; A61B 3/10; G01C 19/02; G01C 19/42; G01C 22/00; G01C 25/00
USPC ............... 701/502, 434, 484, 500, 541, 4, 25, 701/506, 526, 468; 702/160, 189, 141, 6, 702/135, 19, 95, 9, 92, 94; 455/418, 3.01, 455/412.1, 574
See application file for complete search history.

(56) References Cited

U.S. PATENT DOCUMENTS

| 7,499,797 | B2 * | 3/2009 | Mok ............................. 701/434 |
| 7,764,641 | B2 * | 7/2010 | Pelton et al. .................. 370/328 |
| 7,805,275 | B2 * | 9/2010 | Kitamura et al. ............. 702/150 |
| 7,962,309 | B2 * | 6/2011 | Meriheina ..................... 702/141 |
| 8,287,377 | B2 * | 10/2012 | Sato ................................. 463/37 |
| 8,452,273 | B1 * | 5/2013 | Khomenko et al. .......... 455/418 |
| 8,547,907 | B2 * | 10/2013 | Pelton et al. .................. 370/328 |
| 2003/0191582 | A1 * | 10/2003 | Terada ........................... 701/207 |
| 2007/0168126 | A1 * | 7/2007 | Wence et al. .................. 701/220 |
| 2008/0190201 | A1 * | 8/2008 | Makino ........................... 73/510 |
| 2009/0240461 | A1 * | 9/2009 | Makino et al. ................ 702/141 |
| 2010/0156788 | A1 * | 6/2010 | Nakaoka ........................ 345/158 |
| 2011/0208472 | A1 * | 8/2011 | Fujiwara ....................... 702/141 |
| 2012/0035881 | A1 * | 2/2012 | Rubin et al. ................... 702/141 |
| 2012/0264447 | A1 * | 10/2012 | Rieger, III ................. 455/456.1 |
| 2013/0138386 | A1 * | 5/2013 | Jain et al. ...................... 702/141 |
| 2013/0138388 | A1 * | 5/2013 | Jain et al. ...................... 702/141 |
| 2013/0191034 | A1 * | 7/2013 | Weast et al. ..................... 702/19 |

(Continued)

*Primary Examiner* — Calvin Cheung
*Assistant Examiner* — Luis A Martinez Borrero
(74) *Attorney, Agent, or Firm* — Lindauer Law, PLLC (57) ABSTRACT

Techniques are described for determining a direction in which a computing device is being transported by a user who is walking, running, or otherwise moving relative to a direction in which the device is being held. Acceleration data may be collected by accelerometers of the device during a time window, and transformed to determine a rotated acceleration along one or more candidate directions. The rotated acceleration is transformed to a frequency domain, and a peak power is determined within the frequency transformed acceleration data for each candidate direction. The peak powers are compared across multiple candidate directions, and the candidate direction having a higher peak power may be designated as a movement direction of the device relative to the device orientation. A gross movement direction may be determined based on magnetometer data, and may be employed for navigation or other applications.

20 Claims, 9 Drawing Sheets

(56) References Cited

U.S. PATENT DOCUMENTS

2013/0231889 A1* 9/2013 Hrybyk et al. ............... 702/141
2013/0282325 A1* 10/2013 Takahashi et al. ........... 702/141
2013/0331124 A1* 12/2013 Rieger, III ................. 455/456.1
2014/0105054 A1* 4/2014 Sægrov et al. ............... 370/252
2014/0171053 A1* 6/2014 Stephens ...................... 455/418

* cited by examiner

USING ACCELEROMETER DATA TO DETERMINE MOVEMENT DIRECTION

BACKGROUND

The increasing popularity of mobile computing devices has led many developers to create applications to execute on such devices. Many mobile device applications employ information regarding the user's location to provide context-based or location-based information to the user. However, in some cases it may be difficult to determine information regarding movements of the user while the user is carrying the device, due to imprecision.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

This disclosure describes implementations of systems, devices, methods, and computer-readable media for determining a direction in which a user is moving while transporting a computing device. Implementations support determining the direction in which the user is moving while the user is walking, running, riding a bicycle, or performing some other type of translational movement that is caused by a substantially periodic or repeated action such as the user's strides while walking or running. Orientation sensors such as a magnetometer or a gyroscopic sensor device may indicate an orientation of the computing device while it is being transported by the user. However, such sensors may not provide accurate information regarding a direction in which the user is moving if the user is holding the computing device at an angle relative to the direction of movement. Implementations employ accelerometer data collected by accelerometers in the computing device to determine a direction of translational movement of the user, or of the computing device, relative to the orientation of the computing device.

Accelerometer data may be collected by accelerometers in the computing device, the acceleration data indicating acceleration of the computing device along one or more directional axes. The accelerometer data may be collected during a sliding time window. The sliding window may be of a predetermined duration, or may include at least a predetermined number of cycles of the user's movement such as three strides while the user is walking or running. For one or more candidate directions within at least a 180 degree arc, the collected acceleration data (adjusted to exclude gravitational acceleration) may be transformed via rotation into a reference frame corresponding to the candidate direction. The rotated acceleration data may then be transformed to the frequency domain using a Fast Fourier Transform (FFT), a Discrete Fourier Transform (DFT), or another transform. For each candidate direction, a peak power is determined as the highest power of the rotated acceleration data in the frequency domain. The peak powers corresponding to the various candidate directions are compared and the candidate direction having the highest peak power may be identified as a direction of the user's movement relative to the device.

A gross direction of movement may be determined based on combining the relative movement direction with magnetometer data or other information indicating a gross orientation of the computing device with respect to its surroundings. The gross direction of movement may be employed in navigation applications or other applications executing on the computing device or elsewhere. As used herein, a gross direction of movement may refer to a direction with respect to a global coordinate system such as compass directions (e.g., north, south, east, or west). For example, implementations may determine that the user is carrying the computing device in a gross direction that is south-by-southwest, or approximately 112.5 degrees relative to north (e.g., 0 degrees). The gross direction of movement may also refer to a direction with respect to one or more objects, persons, or locations in proximity to the user. For example, implementations may determine that the user is walking in a gross direction toward a particular address, landmark, business, geographical feature, or person. As used herein, a gross orientation of the user device may refer to an orientation of the user device with respect to a global coordinate system or with respect to one or more objects, persons, or locations in proximity to the user device.

Figure 1:
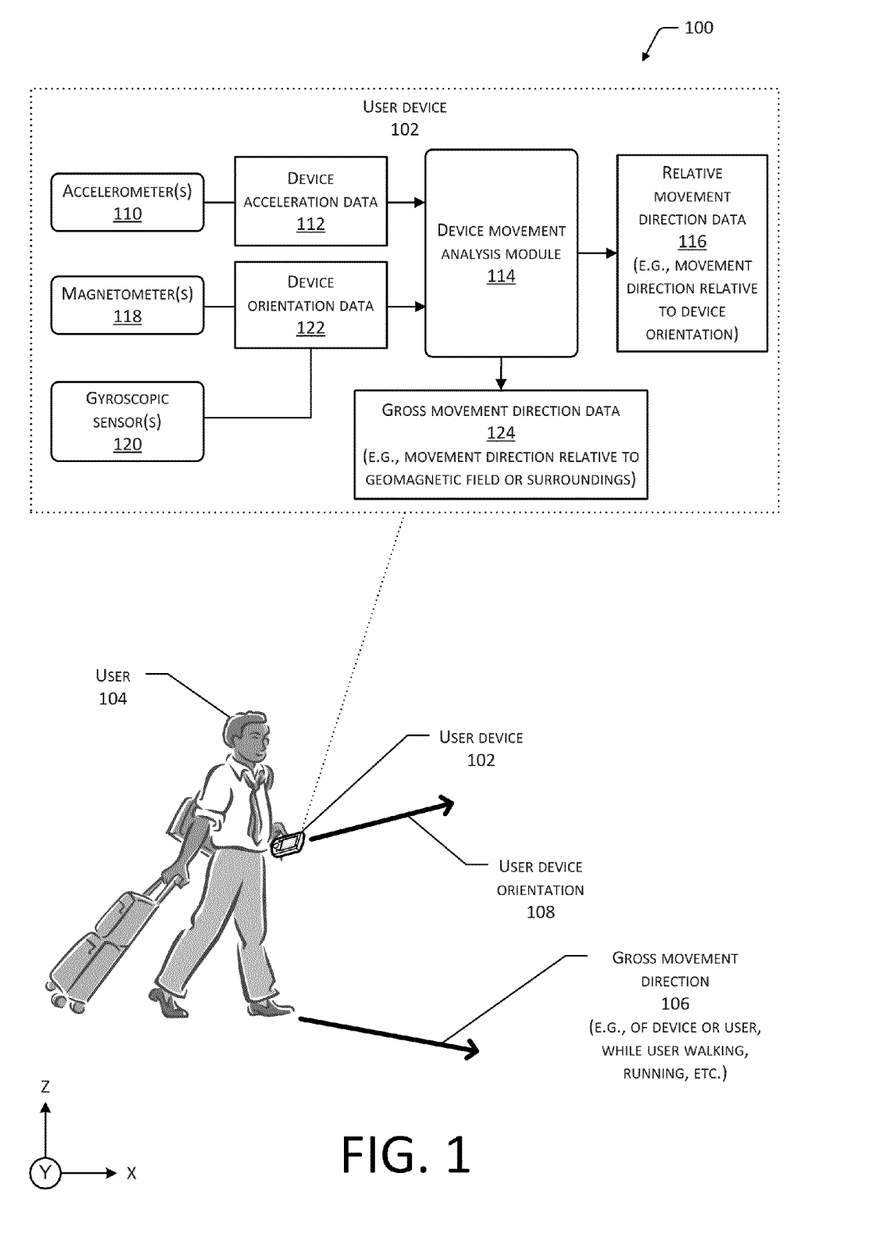
FIG. 1 depicts an environment for determining movement direction based at least partly on accelerometer data, including a user device having one or more accelerometers.

FIG. 1 depicts an environment 100 for determining a movement direction of a user device 102, or of a user 104, while the user 104 is transporting the user device 102. The user device 102 may include any type of movable computing device, including but not limited to a smartphone, a tablet computer, a wearable computer, an implanted computer, a mobile gaming device, an electronic book reader, an automotive computer, and so forth. An example of the user device 102 is described further with reference to FIG. 2. The movement of the user device 102, and of the user 104 transporting the user device 102, may be characterized as having a gross movement direction 106. The gross movement direction 106 may be a vector quantity that points in a direction relative to a global coordinate system or relative to one or more objects, persons, or locations in proximity to the user 104. The user device 102 may be characterized as having a user device orientation 108, which may described as a gross orientation of the user device 102.

Although FIG. 1 depicts the user 104 as walking while carrying the user device 102, implementations are not limited to this scenario. Implementations support determining the direction in which the user 104 is moving while walking, running, riding a bicycle, or performing some other type of translational movement that is caused by a substantially periodic movement, such as the user's stride while walking or running. Implementations support determining a movement direction while the user 104 is carrying the user device 102 in hand (as shown), or carrying the user device 102 in a pocket, in a bag, or in other types of luggage. Implementations also support determining a movement direction while the user 104 is wearing the user device 102 as a wearable computing device, such as a computing device that is integrated into a wristwatch, a hat, a headset, glasses, a necklace, a belt, shoes, and so forth.

The user device 102 may include one or more accelerometers 110 of any type. In some cases, the accelerometer(s) 110 may measure an acceleration of the user device 102 along one or more directional axes, such as along an X axis, Y axis, and Z axis relative to the user device 102. The accelerometer(s) 110 may measure acceleration relative to a frame of reference of the user device 102, adjusted to remove acceleration due to the Earth's (or another) gravitational field. The accelerometer(s) 110 may employ any type of technology to measure acceleration of the user device 102. For example, the accelerometer(s) 110 may employ piezoelectric, piezoresistive, capacitive, or other types of components to convert mechanical motion into an electrical signal indicating acceleration. The accelerometer(s) 110 may include microelectromechanical systems (MEMS).

The accelerometer(s) 110 may generate device acceleration data 112, indicating an acceleration of the user device 102 along one or more directional axes. The device acceleration data 112 may be received by a device movement analysis module 114 executing on the user device 102. The device movement analysis module 114 may analyze the device acceleration data 112 to determine relative movement direction data 116. The relative movement direction data 116 may indicate a direction of movement of the user device 102, or of the user 104 transporting the user device 102, relative to an orientation of the user device 102. The accelerometer(s) 110 may include any number of multidimensional accelerometers that measure acceleration of the user device 102 along two or more directional axes, such as along two perpendicular axes. The accelerometer(s) 110 may include any number of unidimensional accelerometers that each measure acceleration of the user device 102 along a single directional axis.

In some implementations, the user device 102 may include one or more magnetometers 118, one or more gyroscopic sensors 120, or other sensor devices that generate device orientation data 122. The magnetometer(s) 118 may include one or more compasses, one or more microelectromechanical systems (MEMS) magnetometers, or other types of magnetometers. The device orientation data 122 may indicate a gross orientation of the user device 102. For example, in cases where the device orientation data 122 is generated by the magnetometer(s) 118, the device orientation data 122 may describe the orientation of the user device 102 relative to magnetic north. In cases where the device orientation data 122 is generated by the gyroscopic sensor(s) 120, the device orientation data 122 may include information describing linear accelerations, angular accelerations, or other movements of the user device 102. Such information may be integrated or otherwise processed to determine an orientation of the user device 102. In some implementations, the device orientation data 122 may be employed in conjunction with the device acceleration data 112 to determine the relative movement direction data 116 and gross movement direction data 124. The gross movement direction data 124 may indicate a movement direction of the user device 102, or the user 104, relative to a global coordinate system or relative to one or more objects, persons, or locations in proximity the user 104. Operations of the device movement analysis module 114 to determine the relative movement direction data 116 and the gross movement direction data 124 are described further with reference to FIGS. 3-8.

The gross movement direction data 124 may be employed by processes or applications executing on the user device 102, or may be provided to other external devices for use by external processes or applications. For example, the user 104 may be walking down a city street and employing a navigation application on the user device 102 to reach a destination. Because the navigation application has access to the gross movement direction data 124, the navigation application may provide directions to the user 104 (e.g., turn left in 20 meters) based on the gross movement direction of the user 104. Implementations may detect when the user 104 has altered his or her direction of movement while walking, running, riding a bicycle, and so forth, and may distinguish such movement direction changes from changes in the orientation of the user device 102 while the user 104 is still walking in the same direction. Such distinctions may enable the navigation application to provide more accurate and useful navigational directions to the user 104.

Figure 2:
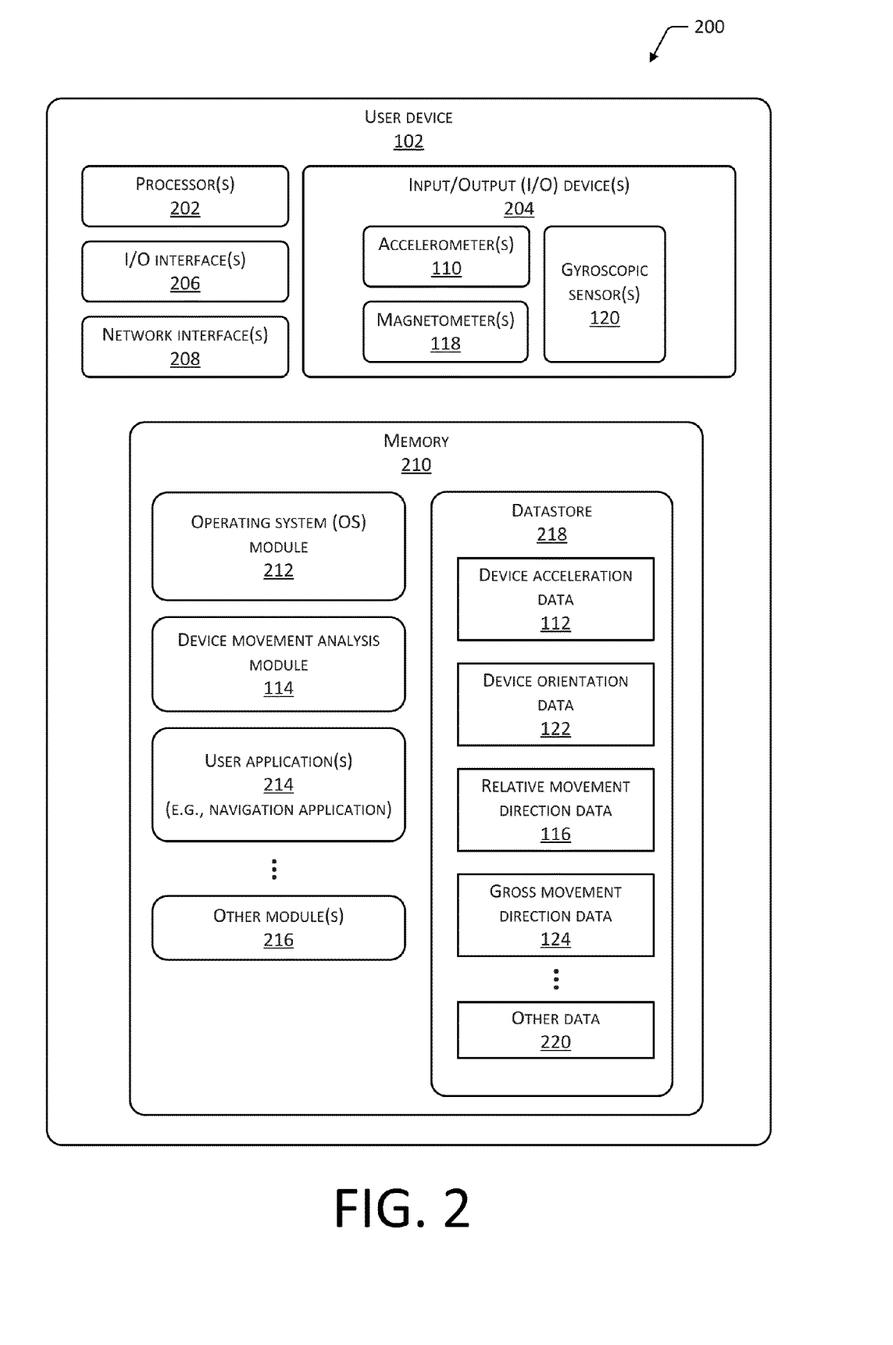
FIG. 2 depicts a block diagram of an example user device configured to perform operations for determining movement direction based at least partly on accelerometer data.

FIG. 2 depicts a block diagram 200 of an example of the user device 102. As shown in block diagram 200, the user device 102 may include one or more processors 202 configured to execute one or more stored instructions. The processor(s) 202 may comprise one or more cores.

The user device 102 may include one or more input/output (I/O) devices 204. The I/O device(s) 204 may include user input devices such as a keyboard, a mouse, a pen, a game controller, a voice input device, a touch input device, a gestural input device, a haptic input device, or other devices. The I/O device(s) 204 may also include output devices such as a display, a printer, audio speakers, haptic output devices, and so forth. The I/O device(s) 204 may be physically incorporated with the user device 102, or may be externally placed.

The I/O device(s) 204 may include the accelerometer(s) 110. As described above, the accelerometer(s) 110 may generate the device acceleration data 112 indicating an acceleration of the user device 102 in at least one direction. The I/O device(s) 204 may also include the magnetometer(s) 118. The magnetometer(s) 118 may generate the device orientation data 122 indicating an orientation of the user device 102 relative to a geomagnetic field, such as an orientation that is an angular difference from magnetic north. The I/O device(s) 204 may also include the gyroscopic sensor(s) 120. The gyroscopic sensor(s) 120 may generate the device orientation data 122 indicating an orientation of the user device 102 relative to a horizontal plane or relative to some other reference frame.

The user device 102 may include one or more I/O interfaces 206 to enable components or modules of the user device 102 to control, interface with, or otherwise communicate with the I/O device(s) 204. The I/O interface(s) 206 may enable information to be transferred in or out of the user device 102, or between components of the user device 102, through serial communication, parallel communication, Ethernet, or other types of communication. For example, the I/O interface(s) 206 may comply with the RS-232 standard for serial ports, or with the Institute of Electrical and Electronics Engineers (IEEE) 1284 standard for parallel ports. As another example, the I/O interface(s) 206 may be configured to provide a Universal Serial Bus (USB) connection. The user device 102 may also include one or more busses or other internal communications hardware or software that allow for the transfer of data between the various modules and components of the user device 102.

The user device 102 may include one or more network interfaces 208 to enable communications between the user device 102 and other networked devices. The network interface(s) 208 may include one or more network interface controllers (NICs) or other types of transceiver devices configured to send and receive communications over a network.

The user device 102 may include one or more memories, described herein as memory 210. The memory 210 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 210 provides storage of computer-readable instructions, data structures, program modules, and other data for the operation of the user device 102.

The memory 210 may include an operating system (OS) module 212. The OS module 212 is configured to manage hardware resources such as the I/O device(s) 204, the I/O interface(s) 206, and the network interface(s) 208, and to provide various services to applications, processes, or modules executing on the processor(s) 202. The OS module 212 may include one or more of the following: any version of UNIX®, originally developed at Bell Laboratories, including any version of the Linux® operating system originally released by Linus Torvalds, any version of BSD UNIX originally developed at the University of California, Berkeley, Solaris® originally developed by Sun Microsystems® of Santa Clara, Calif., HP-UX® developed by Hewlett-Packard Co.® of Palo Alto, Calif., AIX® developed at IBM®, and others; any version of iOS® from Apple Corp. of Cupertino, Calif.; any version of Windows® or Windows Mobile® from Microsoft Corp.® of Redmond, Wash.; any version of Android® from Google, Corp.® of Mountain View, Calif. and its derivatives from various sources; any version of Palm OS® from Palm Computing, Inc.® of Sunnyvale, Calif. and its derivatives from various sources; any version of BlackBerry OS® from Research In Motion Ltd.® of Waterloo, Ontario, Canada; any version of VxWorks® from Wind River Systems® of Alameda, Calif.; or other operating systems.

In some implementations, the memory 210 includes the device movement analysis module 114, which performs operations for determining a direction of movement of the user device 102, or of the user 104 transporting the user device 102. Such operations are described further with reference to FIGS. 3-8. The memory 210 may also include one or more user applications 214 that employ the relative movement direction data 116, the gross movement direction data 124, or both, as generated by the device movement analysis module 114. For example, the user application(s) 214 may include a navigation application that provides navigational information based on the gross movement direction data 124.

The memory 210 may also include one or more other modules 216, such as a user authentication module, an access control module, a security or cryptography module, and so forth.

The memory 210 may include a datastore 218 to store information for operations of the user device 102. The datastore 218 may comprise a database, array, structured list, tree, or other data structure, and may be a relational or a non-relational datastore. The datastore 218 may store one or more of the device acceleration data 112, the device orientation data 122, the relative movement direction data 116, or the gross movement direction data 124. The datastore 218 may also store other data 220, such as user account information, user authentication information, data employed by the user application(s) 214, and so forth. In some implementations, at least a portion of the information stored in the datastore 218 may be stored externally to the user device 102, on other devices that are in communication with the user device 102 via the I/O interface(s) 206 or the network interface(s) 208.

Figure 3:
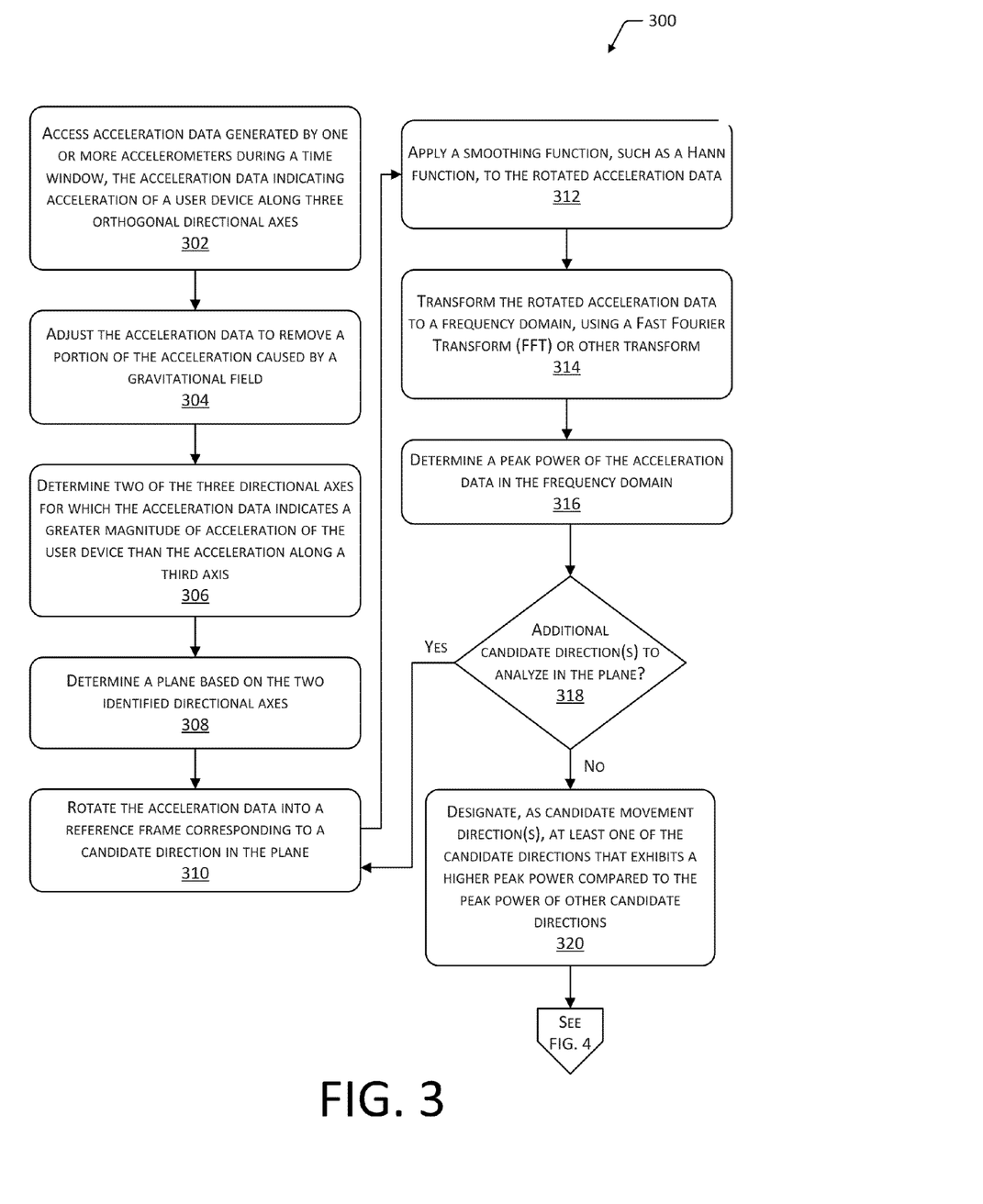
FIG. 3 depicts a flow diagram of a process for determining movement direction based at least partly on accelerometer data.
Figure 4:
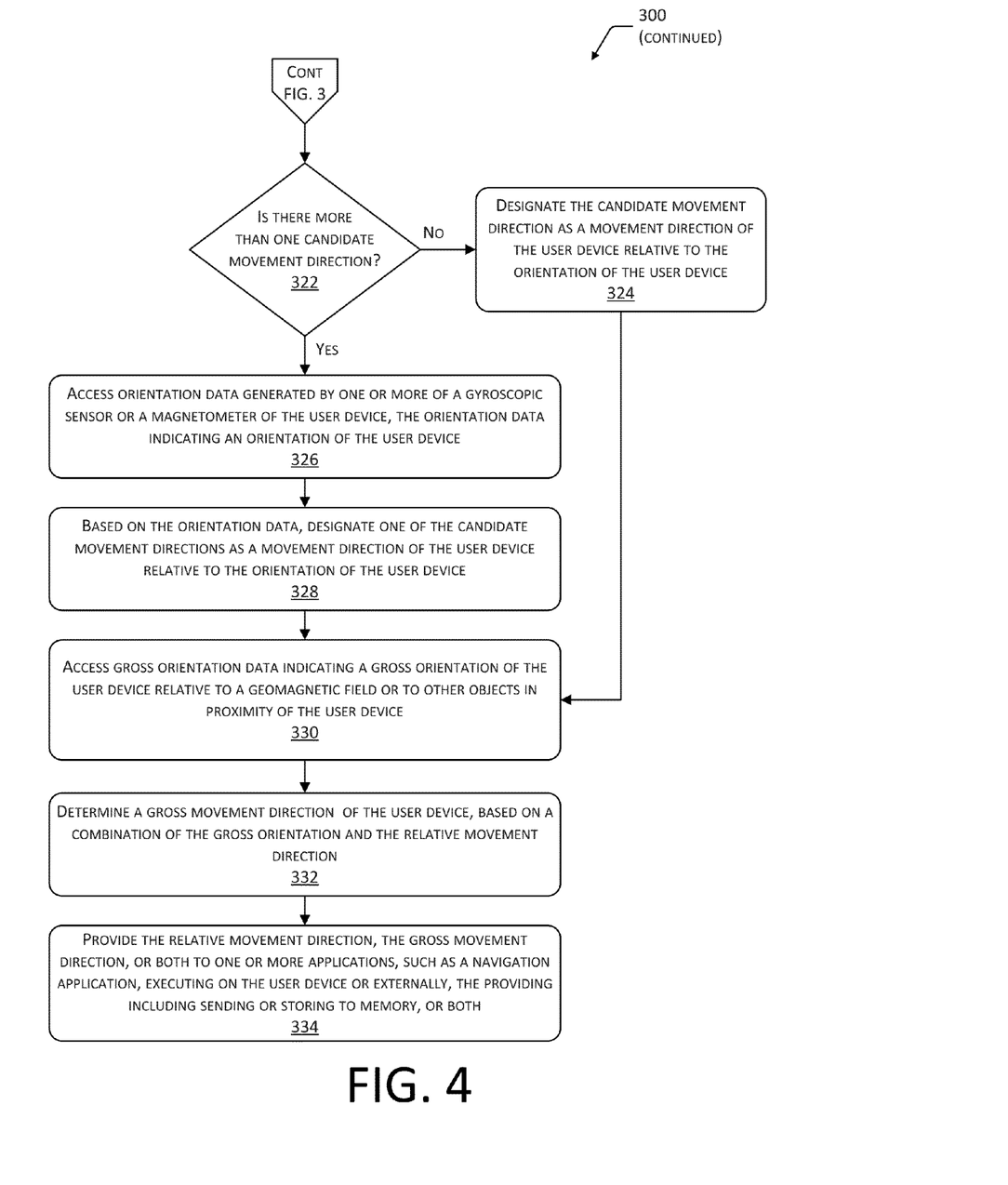
FIG. 4 depicts a continuation of the flow diagram of the process for determining movement direction based at least partly on accelerometer data.

FIGS. 3 and 4 depict a flow diagram 300 of a process for determining a movement direction of the user device 102, or of the user 104 transporting the user device 102. One or more operations of the process may be performed by the device movement analysis module 114, or by another module or application executing on the user device 102. Alternatively, one or more operations of the process may be performed externally to the user device 102.

At 302, acceleration data is accessed. Such acceleration data may include the device acceleration data 112 generated by the accelerometer(s) 110. In some cases, the acceleration data may be received directly from the accelerometer(s) 110. Alternatively, the acceleration data may be accessed after being stored in memory on the user device 102. The acceleration data may indicate an acceleration of the user device 102 along one or more directional axes. For example, the acceleration data may indicate an acceleration of the user device 102 along one, two, or three orthogonal coordinate axes, such as Cartesian axes (e.g., an X axis, a Y axis, and a Z axis).

In some implementations, the acceleration data may be generated by the accelerometer(s) 110 during a particular time window that is a time period from a start time to and end time. The time window may be a predetermined duration (e.g., 3 seconds), or may be determined to include a predetermined number of cycles of the user's movement, such as at least three strides while the user 104 is walking or running. In either case, the time window may be determined such that sufficient acceleration data may be collected to enable a determination of a movement direction during the time window. The time window may be a sliding time window.

As used herein, a sliding time window refers to a time period that has a substantially constant duration while moving forward in time. For example, the process of FIG. 3 may analyze a first set of acceleration data that is collected to determine a movement direction during a first time window from T to T+3 seconds, where T is any arbitrary start time. The process of FIG. 3 may then analyze a second set of acceleration data that is collected to determine a movement direction during a second time window from T+3 to T+6. Implementations may determine a movement direction during any number of time windows which are overlapping or non-overlapping. In some implementations, the time window may be described in terms of number of samples of acceleration data collected during the time window. For example, in some cases the time window may be of a size corresponding to 256 samples, and the window may slide 32 samples during each iteration of the process.

In some implementations, the time window may be tuned based on various considerations. For example, a shorter time window may be used in cases where the user 104 is exhibiting a faster stride, given that acceleration data for a sufficient number of cycles of the user's stride may be acquired during the shorter time window. Moreover, in some cases a shorter time window may be employed when it is determined that the user 104 is walking indoors, given that the user 104 may make more frequent direction changes while walking indoors than would be made while walking outdoors, and more accurate movement direction determinations may be made using a shorter time window.

At 304, the acceleration data may be adjusted to remove at least a portion of the acceleration data that is caused by a gravitational field, such as the Earth's gravitational field. The gravity-adjusted acceleration data may indicate a linear acceleration of the user device 102 relative to its own frame of reference. The adjustment at 304 may be performed by the device movement analysis module 114. Alternatively, the adjustment may be performed by the accelerometer(s) 110, so that the device acceleration data 112 describes the linear acceleration of the user device 102.

At 306, in some implementations the acceleration data may be analyzed to determine a magnitude of the acceleration in each of three directional axes, such as Cartesian axes, relative to the frame of reference of the user device 102. Two of the three directional axes may be determined for which the acceleration data indicates a greater magnitude of acceleration than the acceleration along the third axis. At 308, a plane may be determined based on the two directional axes identified at 306. The remainder of the process described by FIGS. 3 and 4 may be performed on the subset of the acceleration data that describes the acceleration of the user device 102 in directions that are within the plane determined at 308.

In some implementations, the orientation of the user device 102 may be monitored based on the device orientation data 122 generated by the gyroscopic sensor(s) 120, the device orientation data 122 describing one or more of a yaw, a pitch, or a roll of the user device 102. When the device orientation data 122 indicates a change in the orientation of the user device 102 that is above a particular orientation change threshold such that it may be considered a significant change in orientation, the process may perform the operations of 306 and 308 to re-determine the plane in which to analyze the acceleration data.

A plurality of candidate directions may be designated within the plane determined at 308. In some implementations, the candidate directions are separated by a predetermined angular distance such as 1 degree, 5 degrees, 10 degrees, or 20 degrees. The plurality of candidate directions may be included in an arc within the plane. In some implementations, the arc spans 360 degrees within the plane. Alternatively, the arc may span 180 degrees within the plane, or any other angular distance. In some cases, the candidate directions may be determined based on a search pattern to search the space of possible candidate directions for the movement direction. For example, the candidate directions may be based on a binary search pattern within 360 degrees or 180 degrees of arc within the plane. Alternatively, the candidate directions may be based at least in part on a directed search pattern which selects a candidate direction based on the result of the movement direction analysis performed for at least one previous candidate direction.

In some cases, as described further below, the analysis may designate two candidate movement directions that are separated by 180 degrees in angular distance, and orientation data (e.g., gyroscopic sensor data) may be employed to determine which of the two candidate movement directions corresponds more closely to the actual movement direction. In such cases, the candidate directions may substantially cover 180 degrees of arc, because testing the candidate directions in the other half of the plane may be superfluous given that analysis may determine two candidate movement directions separated by 180 degrees.

Figure 5:
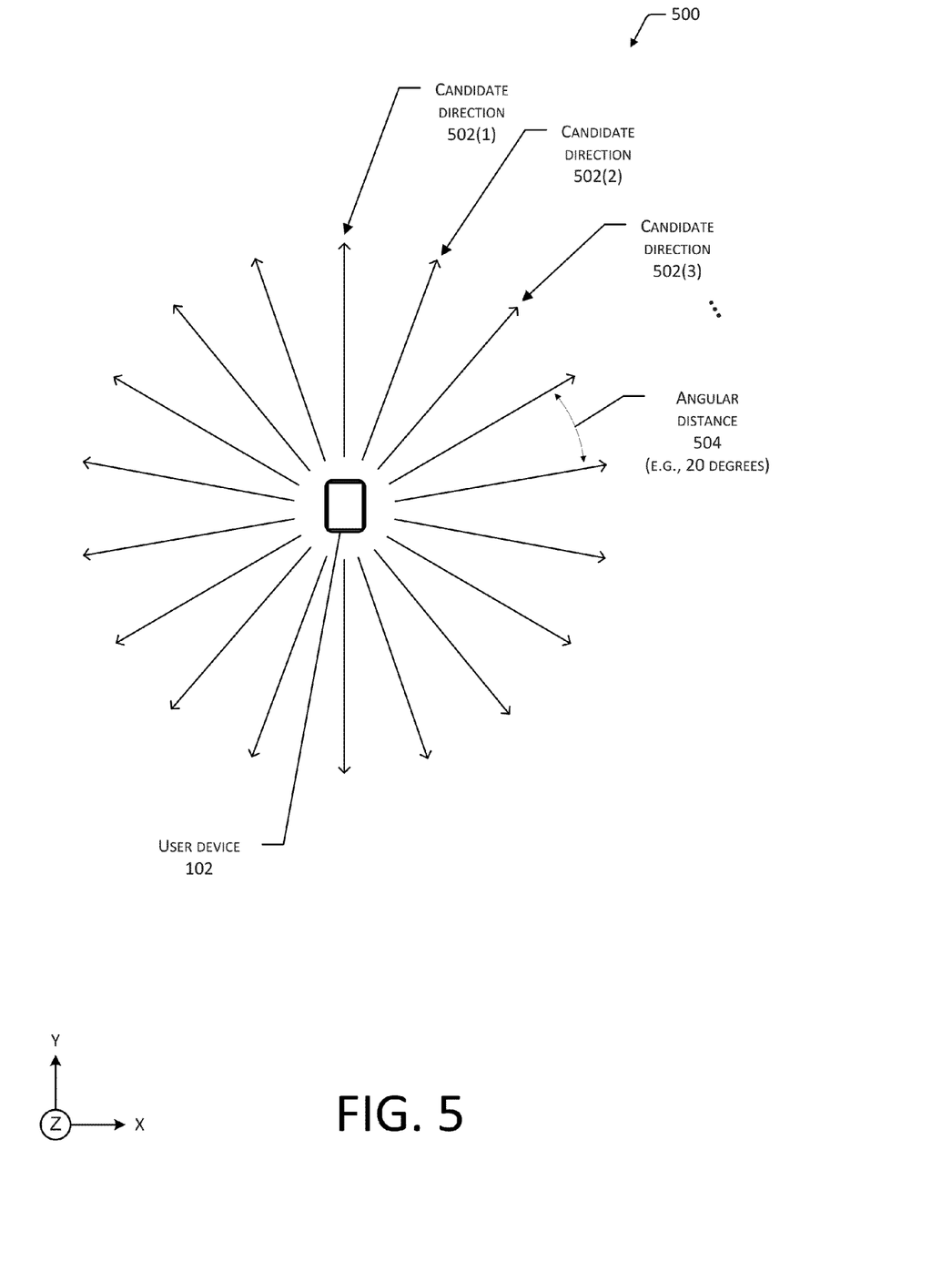
FIG. 5 depicts a schematic showing a plurality of example candidate directions for which to analyze accelerometer data, the candidate directions relative to the user device.

FIG. 5 depicts a schematic 500 illustrating example candidate directions. The schematic 500 illustrates implementations in which multiple candidate directions 502 are spaced at substantially equal angular distances from each other, pointing away from the user device 102 in the plane determined at 308. In FIG. 5, the X-axis and the Y-axis define the plane determined at 308. In the example of FIG. 5, the angular distance 504 between the candidate directions 502 is 20 degrees. This example of the angular distance 504 is not limiting of implementations, which may employ any angular distance 504 separating the candidate directions 502. Further, implementations may support a fixed angular distance, or a variable angular distance.

In some implementations, the angular distance 504 may be predetermined prior to the beginning of analysis, and may be adjusted or tuned based on device performance considerations. For example, a smaller angular distance 504 may provide for a larger number of the candidate directions 502, and may enable a more accurate determination of the relative or gross movement direction 106 of the user device 102, but may provide for a longer processing time that costs more processing capacity on the user device 102. A larger angular distance 504 may enable a less accurate, but faster and less costly determination of the movement direction. Accordingly, the angular distance 504 may be determined based on an analysis weighing performance against accuracy. In some implementations, a lower bound may be set on the angular distance 504. For example, some implementations may determine the movement direction within at most a 5 degree margin of error due to uncertainties in the analyzed acceleration data, measurement tolerances of the accelerometers, or for other reasons. In such cases, the angular distance 504 may not be set lower than 5 degrees, given that a smaller angular distance 504 may incur performance costs but may not provide increased accuracy in determining the movement direction.

Returning to FIG. 3, at 310 the acceleration data is transformed via a rotation into a reference frame corresponding to one of the candidate directions 502 in the plane determined at 308. This rotation may be a vector rotation of the acceleration data based on the candidate direction 502. In some implementations, the rotation of the acceleration data is performed by applying a rotation matrix R to a vector quantity that describes the acceleration data in the plane. R may be defined as:

$$R = \begin{bmatrix} \cos\theta & -\sin\theta \\ \sin\theta & \cos\theta \end{bmatrix}$$

where $\theta$ indicates the angular distance between the candidate direction 502 and a baseline direction (e.g., 0 degrees). A vector quantity of the acceleration may be rotated toward the candidate direction 502, $\theta$, through a vector multiplication:

$$\begin{pmatrix} a'_x \\ a'_y \end{pmatrix} = \begin{pmatrix} a_x \\ a_y \end{pmatrix} * \begin{bmatrix} \cos\theta & -\sin\theta \\ \sin\theta & \cos\theta \end{bmatrix}$$

In this example, $a_x$ and $a_y$ designate the acceleration along an x-axis and along a y-axis prior to rotation toward the candidate direction 502, and $a_x'$ and $a_y'$ designate the acceleration along an x-axis and along a y-axis after rotation. Based on the vector multiplication above, $a_x'$ and $a_y'$ may be calculated as follows:

$$a_x' = a_x \cos\theta - a_y \sin\theta$$

$$a_x' = a_x \cos\theta - a_y \sin\theta$$

At 312, in some implementations one or more operations may be performed to smooth the acceleration data after it has been rotated into a reference frame corresponding to the candidate direction 502. Such smoothing operations may ensure appropriate analysis of the acceleration data that is near the edges of the time window. In some implementations, this may include applying a Hann function or another smoothing algorithm to the rotated acceleration data.

At 314, at least a portion of the rotated acceleration data is transformed from a time domain to a frequency domain. Such a transformation may be performed using a Fourier Transform such as a FFT or a DFT. Implementations also support the use of other algorithms to transform the rotated acceleration data to the frequency domain.

Figure 6:
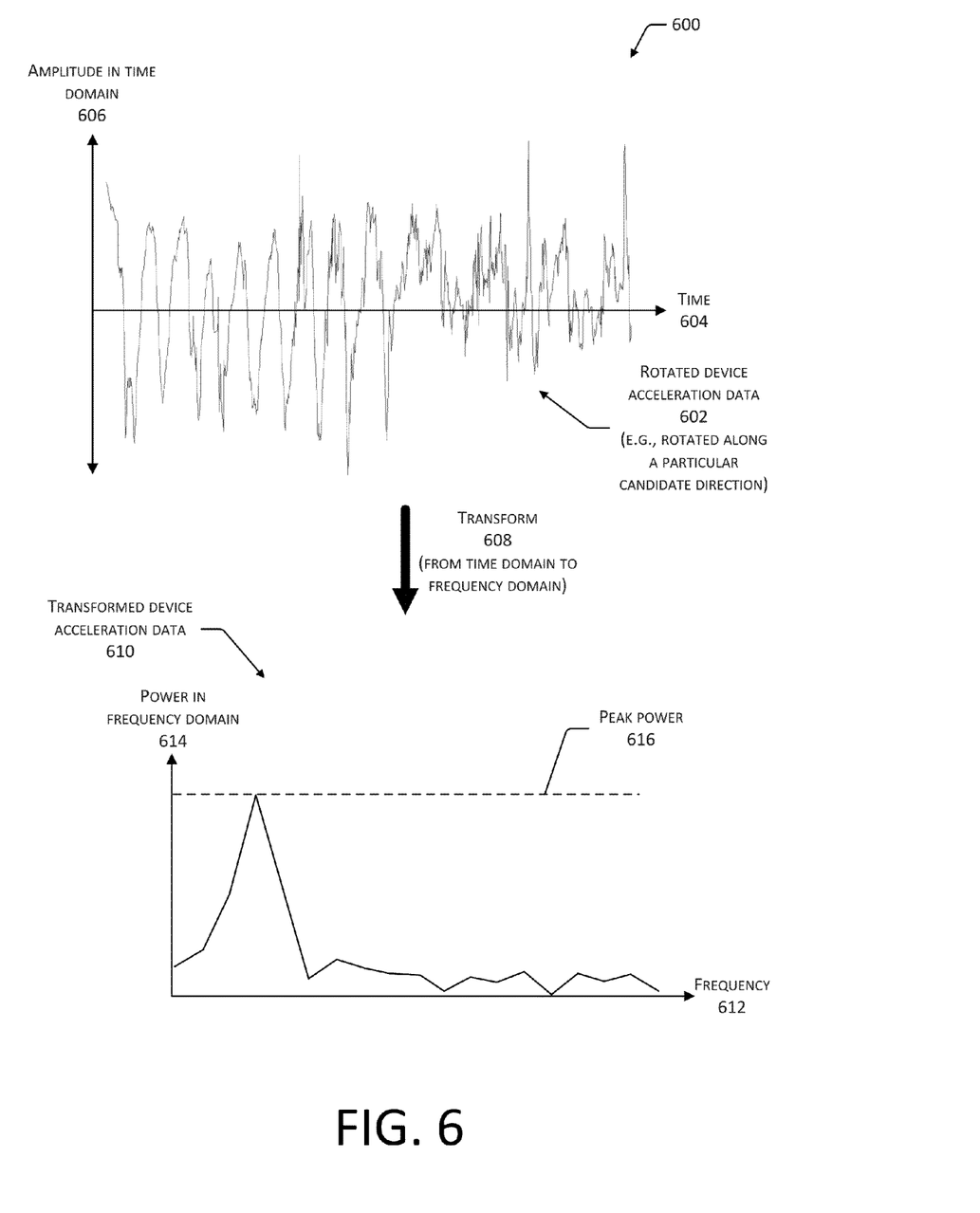
FIG. 6 depicts a schematic showing an example of accelerometer data rotated into a reference frame corresponding to a particular candidate direction, and showing an example of the rotated accelerometer data exhibiting a peak power in a frequency domain.

FIG. 6 depicts a schematic 600 illustrating such a transform applied to example acceleration data. The first plot shows rotated device acceleration data 602 that has been rotated toward a particular candidate direction 502, such as $a_x'$ or $a_y'$ described above. The rotated device acceleration data 602 is plotted as a function of time 604, with the vertical axis indicating the amplitude in the time domain 606, e.g., the amplitude of the acceleration data rotated based on the candidate direction 502. In some implementations, the rotated acceleration data is rotated linear acceleration data, adjusted to account for the acceleration caused by a gravitational field as described above. A transform 608, such as a FFT or a DFT, is applied to transform the acceleration data from the time domain to the frequency domain. The second plot of FIG. 6 shows the transformed device acceleration data 610 following the application of the transform 608. The transformed device acceleration data 610 is plotted as a function of frequency 612, with the vertical axis indicating the power in the frequency domain 614. The transformed device acceleration data 610 may include data with any power at any distribution of frequencies, and the transformed device acceleration data 610 may indicate a peak power 616 at one or more frequencies. The particular data shown in FIG. 6 in the time domain and the frequency domain is not limiting of implementations, which may operate to analyze acceleration data exhibiting any waveform or frequency distribution.

Returning to FIG. 3, at 316 the peak power 616 is determined based on the transformed device acceleration data 610 corresponding to a particular candidate direction 502. In some implementations the peak power 616 is identified by analyzing both the x component and the y component of the acceleration data (e.g., $a_x'$ and $a_y'$ above) transformed into the frequency domain, where the x and y directions correspond to the frame of reference into which the acceleration data has been rotated as described above. Alternatively, in some implementations, the peak power 616 is identified based on either the x component or the y component of the acceleration data transformed into the frequency domain.

In some implementations, the peak power 616 is determined as the highest power of the acceleration data in the frequency domain, as shown in the example of FIG. 6. Alternatively, the peak power 616 may be determined as the highest power unless the second highest peak power in the frequency domain is at least half the power of the highest power. In such cases, the second highest power may be designated as the peak power 616 to filter out spurious frequency components that are not due to walking, running, or other types of translational movement of the user 104.

At 318, a determination is made whether there are additional candidate direction(s) 502 in the plane, for which to analyze the acceleration data. If so, the process may return to 310 and analyze the acceleration data rotated into a reference frame corresponding to another candidate direction 502. If not, the process may proceed to 320. In this way, the process may iterate and determine a peak power 616 corresponding to each candidate direction 502. A table or other data structure that associates each candidate direction 502 with a corresponding peak power 616 may be stored in memory on the user device 102, and used in further operations.

Figure 7:
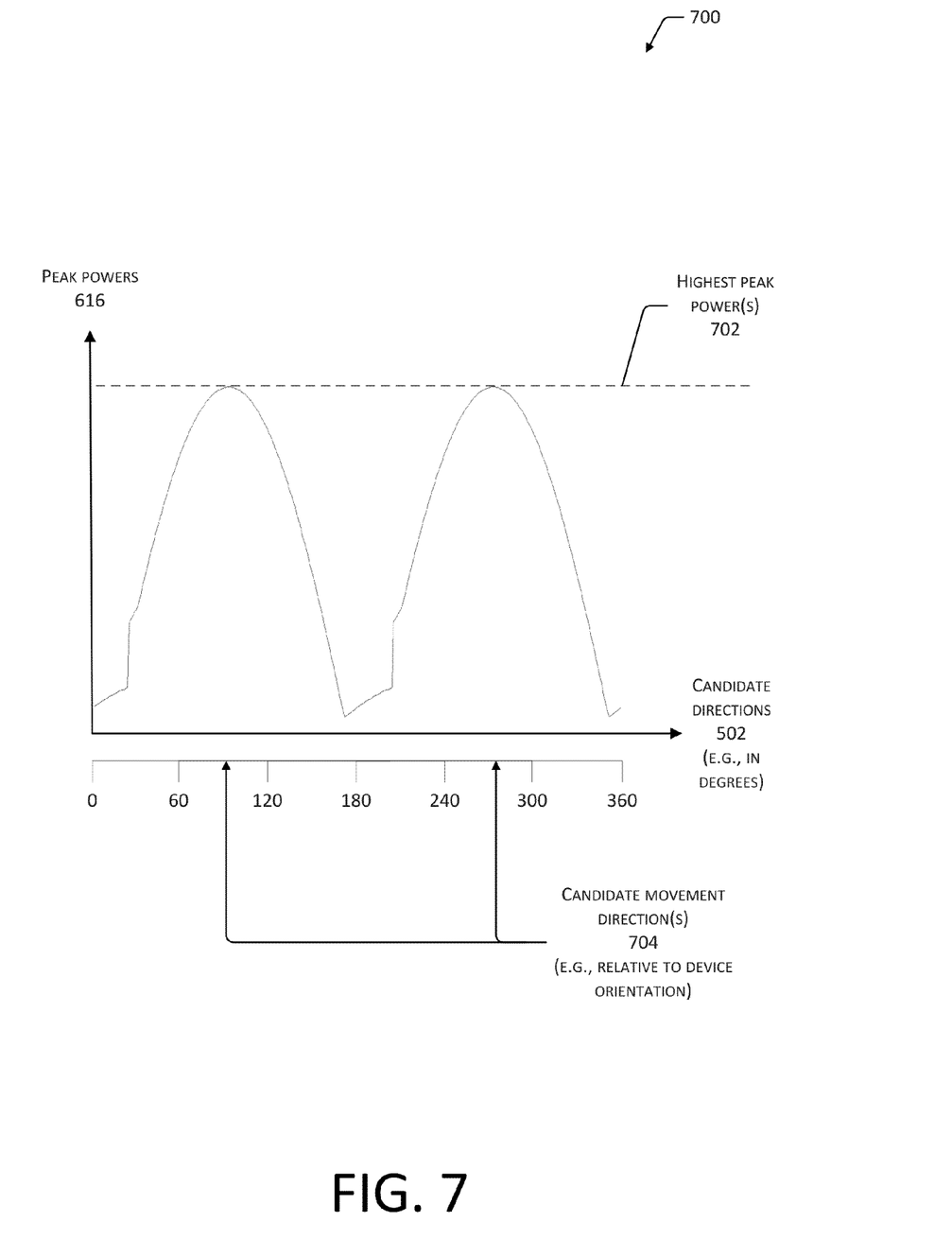
FIG. 7 depicts a schematic showing the peak powers of the acceleration data in a plurality of candidate directions, with at least one highest peak power corresponding to at least one of the candidate directions corresponding to a movement direction of the user device relative to its orientation.

At 320, a highest or maximum of the peak powers 616 for the various candidate directions 502 may be determined. One or more of the candidate directions 502 may be designated as candidate movement directions if they exhibit a higher peak power 616 than the peak power corresponding to other candidate directions 502. FIG. 7 depicts a schematic 700 showing the peak powers 616 of the frequency-transformed, rotated acceleration data corresponding to a plurality of candidate directions 502. In the example of FIG. 7, two of the candidate directions 502 are associated with highest peak powers 702 that are higher than the peak powers 616 of other candidate directions 502. These two candidate directions 502 have been designated as candidate movement directions 704, indicating a possible movement direction of the user device 102 (or the user 104) relative to the orientation of the user device 102. In some implementations, two candidate movement directions 704 may be identified that are 180 degrees apart in angular distance.

The flow diagram 300 continues in FIG. 4. At 322, a determination is made whether more than one candidate movement direction 704 has been designated. If not, the process may proceed to 324, where the one candidate movement direction 704 may be designated as the movement direction of the user device 102 (or the user 104) relative to the orientation of the user device 102. After 324, the process may proceed to 330. If it is determined at 322 that there is more than one candidate movement direction 704 designated, as in the example of FIG. 7, then the process may proceed to 326.

At 326, orientation data is accessed, the orientation indicating an orientation of the user device 102. In some cases, the orientation data may be included in the device orientation data 122 that is generated by the gyroscopic sensor(s) 120, the magnetometer(s) 118, or both the gyroscopic sensor(s) 120 and the magnetometer(s) 118. In cases where two candidate movement directions 704 are designated that are 180 degrees apart from each other, the orientation data may be employed to determine which of the candidate movement directions 704 correspond to the actual relative movement direction of the user device 102. At 328, based on the orientation data, one of the candidate movement directions 704 is designated as the movement direction of the user device 102 relative to the orientation of the user device 102.

In some implementations, the determination of which candidate movement direction 704 corresponds to the actual relative movement direction of the user device 102 may be based at least partly on information generated during a previous iteration of the process during a previous time window. For example, a determination may be made that there are two candidate movement directions 704, for which the relative movement direction during a current time window exhibits either a 20 degree or a 200 degree difference from the relative movement direction determined for a previous time window. The relative movement direction during the current time window may be designated as the candidate movement direction for which the difference is 20 degrees, based on the assumption that a 20 degree change in direction is more likely than a 200 degree change in direction. Thus, at 328 some implementations may designate, as the actual relative movement direction, the candidate movement direction 704 for which the magnitude (e.g., absolute value) of change from a previous relative movement direction is minimized.

At 330, gross orientation data is accessed. The gross orientation data may be included in, or based on, the device orientation data 122. In some cases, the gross orientation data may indicate an absolute or gross orientation of the user device 102 relative to a geomagnetic field of the Earth as determined by the magnetometer(s) 118. Alternatively, the gross orientation data may indicate an orientation of the user device 102 relative to one or more objects, persons, or locations in proximity to the user device 102. Such orientation data may be generated based on a direction from the user device 102 to one or more detected wireless network broadcasts, based on image data recognizing one or more objects having a known position, or based on other information.

Figure 8:
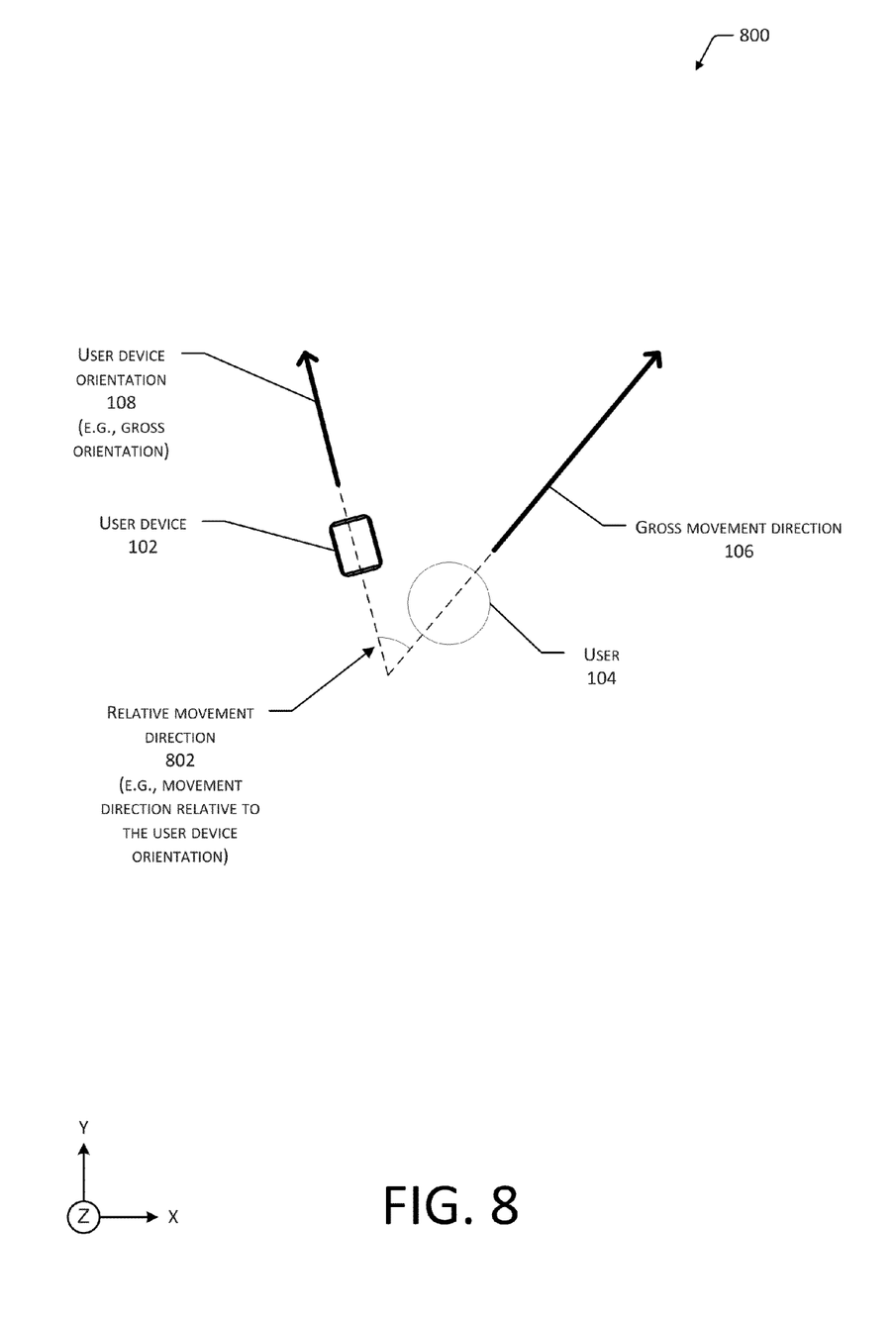
FIG. 8 depicts a schematic illustrating the determination of a gross movement direction of the user device, or of the user transporting the user device, based on a combination of the relative movement direction with a gross orientation of the user device.

At 332, the gross orientation of the user device 102 may be combined with the relative movement direction determined at 328 or 324, to determine the gross movement direction 106. This determination is illustrated in FIG. 8 by schematic 800. As shown in FIG. 8, the user device 102 may have the user device orientation 108 as indicated by magnetometer data or other information. The relative movement direction 802, expressed as an angular distance, may be added to (or subtracted from) the user device orientation 108 to determine the gross movement direction 106 of the user device 102. Because the user device 102 is being transported by the user 104, the gross movement direction 106 also describes a movement direction of the user 104. For example, the gross orientation of the user device 102 may be due north (e.g., 0 degrees), and the relative movement direction 802 may be determined as 45 degrees relative to the orientation of the user device 102. In that case, the gross movement direction 106 may be calculated as 45 degrees from north, or northeast.

Returning to FIG. 4, at 334 one or both of the relative movement direction 802 or the gross movement direction 106 may be provided to one or more applications, such as the user applications 214 executing on the user device 102. For example, as described above, the gross movement direction 106 may be employed by a navigation application to generate navigational directions, indicate landmarks or other locations of interest, or for other purposes. In some cases, one or both of the relative movement direction 802 or the gross movement direction 106 may be stored in memory on the user device 102 or sent to other external devices.

Figure 9:
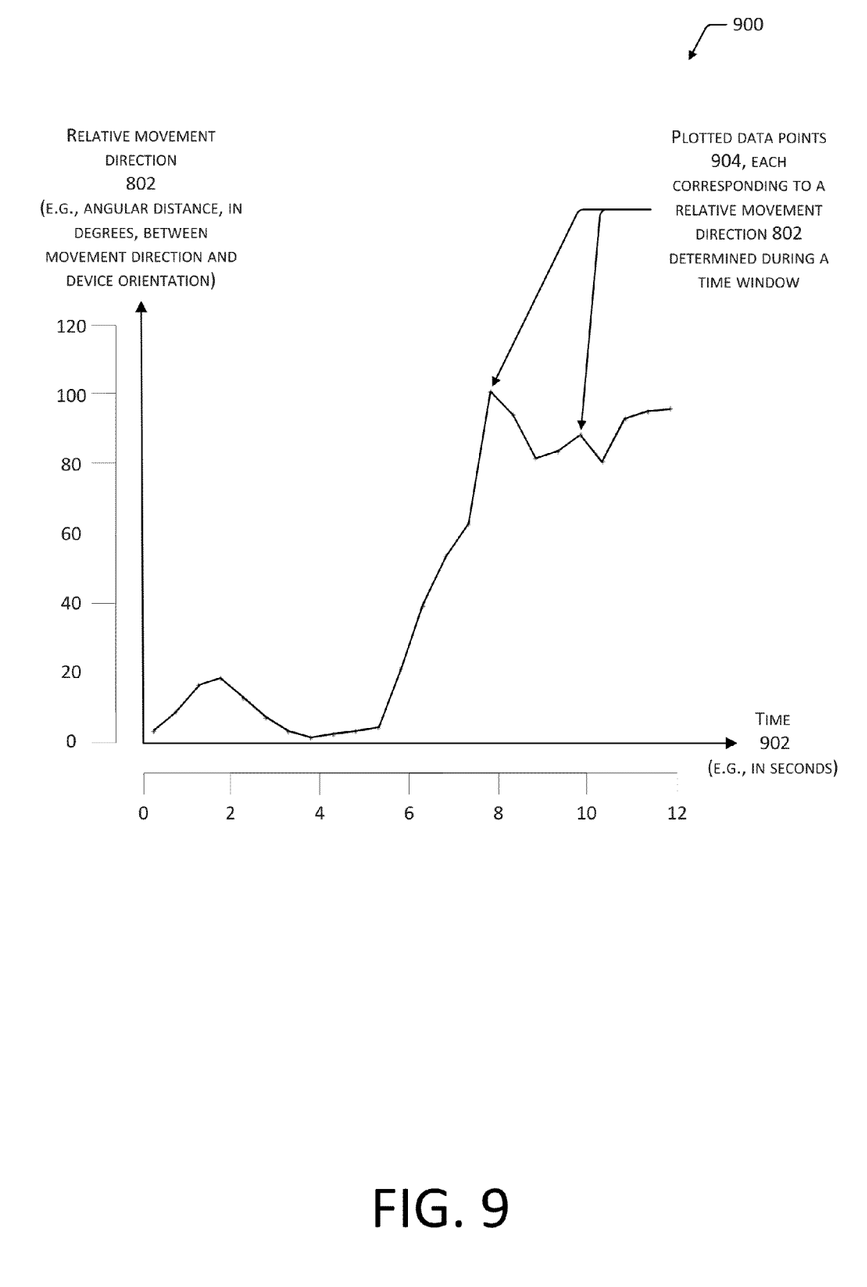
FIG. 9 depicts a schematic of example data for relative movement direction plotted as a function of time.

FIG. 9 depicts a schematic 900 of example data for relative movement direction 802 plotted as a function of time 902. The horizontal axis of the schematic 900 indicates time 902 in seconds from a starting time. The vertical axis of the schematic 900 indicates the relative movement direction 802, expressed in degrees of angular distance between the gross movement direction 106 and the user device orientation 108, as shown in FIG. 8. The schematic 900 provides a graphical summary of multiple relative movement direction(s) 802. In this example, each of the plotted data points 904 indicates a relative movement direction 802 that is determined based on acceleration data collected during a particular time window as described above. For example, each plotted data point 904 may be plotted at a time 902 that is substantially a midpoint of a time window. As the time window moves forward (e.g., slides) in time, additional data points 904 may be generated.

The example data plotted in schematic 900 shows a change in the relative movement direction 802 over time. In this example, at a time of approximately 4 seconds the relative movement direction 802 is near 0 degrees, indicating that the user device 102 is being carried substantially in front of the user 104 while the user 104 is walking, running, or otherwise moving. At a time of approximately 8 seconds, the relative movement direction 802 is near 100 degrees. This may indicate that the user 104 is carrying the user device 102 substantially at his or her side while moving. The change in the relative movement direction 802 over time may indicate that the user 104 has altered his or her gross movement direction 106 while keeping the user device 102 in substantially the same gross orientation, or may indicate that the user 104 has changed the gross orientation of the user device 102 while keeping his or her gross movement direction 106 substantially the same. Moreover, the change in relative movement direction 802 over time may indicate that both the gross movement direction 106 and the gross orientation of the user device 102 have changed in any combination.

Those having ordinary skill in the art will readily recognize that certain steps or operations illustrated in the figures above can be eliminated, combined, subdivided, executed in parallel, or taken in an alternate order. Moreover, the methods described above may be implemented as one or more software programs for a computer system and are encoded in one or more computer-readable storage media as instructions executable on one or more processors.

Separate instances of these programs may be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments, and situations. For example, although the examples herein describe determining the movement direction of the user device 102 transported by the user 104 while he or she is walking or running, implementations are not so limited. Implementations may be used to determine the movement direction while the user 104 is engaged in any type of translational movement that may be caused by a substantially periodic action. Such periodic actions may generate jolts, shocks, or vibrations that are observable in the acceleration data as accelerations having a high power or amplitude in the frequency domain. For example, implementations may detect such shocks due to the user's stride while walking or running. Moreover, implementations may also detect substantially periodic shocks when the user 104 is riding a bicycle or other pedaled vehicle, paddling a boat, riding in a car or train, and so forth, and may analyze that acceleration data to determine a movement direction as described herein.

Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A computer-implemented method, comprising:
accessing acceleration data generated by one or more accelerometers that are configured as one or more hardware resources of a computing device, the acceleration data indicating acceleration of the computing device in a plane while the computing device is being transported;

determining rotated acceleration data based on a rotation of the acceleration data toward each of a plurality of candidate directions within the plane;

transforming at least a portion of the rotated acceleration data to a frequency domain to determine transformed acceleration data for each of the plurality of candidate directions;

determining a peak power of the transformed acceleration data for each of the plurality of candidate directions;

designating at least one candidate direction of the plurality of candidate directions as a translational movement direction of the computing device relative to an orientation of the computing device, the designating of the at least one candidate direction based at least partly on the at least one candidate direction exhibiting a higher peak power compared to the peak power determined for other candidate directions of the plurality of candidate directions;

accessing orientation data indicating a gross orientation of the computing device relative to a geomagnetic field; and combining the gross orientation with the translational movement direction to determine a gross movement direction of the computing device relative to the geomagnetic field.

2. The method of claim 1, wherein the transforming of at least the portion of the rotated acceleration data to the frequency domain includes performing one or more of a Fast Fourier Transform (FFT) or a Discrete Fourier Transform (DFT).

3. The method of claim 1, further comprising:

designating two directional axes based on the acceleration data indicating a greater magnitude of the acceleration along the two directional axes than along a third directional axis, the acceleration data indicating the acceleration of the computing device along three directional axes; and determining the plane based on the two directional axes.

4. The method of claim 1, wherein:

the transforming of at least the portion of the rotated acceleration data to the frequency domain is performed in at least one of two orthogonal directions within the plane; and the determining of the peak power of the transformed acceleration data is for the at least one of two orthogonal directions for each of the plurality of candidate directions.

5. A computing device, comprising:

a memory storing computer-executable instructions; and a processor in communication with the memory, the processor configured to access the memory and execute the computer-executable instructions to:

access acceleration data generated by one or more accelerometers comprising one or more hardware resources of the computing device, the acceleration data indicating acceleration of the computing device;

determine rotated acceleration data based on a rotation of the acceleration data toward each of a plurality of candidate directions;

transform at least a portion of the rotated acceleration data to a frequency domain to determine transformed acceleration data for each of the plurality of candidate directions;

determine a peak power of the transformed acceleration data for each of the plurality of candidate directions; and designate at least one candidate direction of the plurality of candidate directions as a movement direction of a translational movement of the computing device relative to an orientation of the computing device, the designating of the at least one candidate direction based at least partly on the at least one candidate direction exhibiting a higher peak power compared to the peak power determined for other candidate directions of the plurality of candidate directions.

6. The computing device of claim 5, wherein:

the acceleration data indicates the acceleration of the computing device within a plane; and the plurality of candidate directions are separated by an angular distance;

at least two of the plurality of candidate directions are non-perpendicular to each other; and an arc including the plurality of candidate directions is at least 180 degrees within the plane.

7. The computing device of claim 6, wherein the angular distance is 10 degrees.

8. The computing device of claim 5, wherein:

the acceleration data indicates the acceleration of the computing device within a plane; and the plurality of candidate directions are determined based on a search pattern to designate the at least one candidate direction within the plane.

9. The computing device of claim 5, wherein the transforming of at least the portion of the rotated acceleration data to the frequency domain includes performing one or more of a Fast Fourier Transform (FFT) or a Discrete Fourier Transform (DFT).

10. The computing device of claim 5, wherein:

the processor is further configured to:

designate two directional axes based on the acceleration data indicating a greater magnitude of the acceleration along the two directional axes than along a third directional axis, the acceleration data indicating the acceleration of the computing device along three directional axes; and determine a plane based on the two directional axes; and an arc including the plurality of candidate directions is at least 180 degrees within the plane.

11. The computing device of claim 5, wherein:

the at least one candidate direction includes two candidate directions separated by 180 degrees;

the processor is further configured to access orientation data generated by one or more of a gyroscopic sensor or a magnetometer, the orientation data indicating the orientation of the computing device; and the designating of the movement direction includes selecting one of the two candidate directions based on the orientation data.

12. The computing device of claim 5, the processor further configured to:

access orientation data indicating a gross orientation of the computing device relative to a geomagnetic field; and combine the movement direction with the gross orientation of the computing device to determine a gross movement direction of the computing device relative to the geomagnetic field.

13. The computing device of claim 12, wherein the orientation data is generated using a magnetometer of the computing device.

14. The computing device of claim 5, wherein:

the acceleration data is generated by the one or more accelerometers within a time window; and the movement direction describes a movement of the computing device during the time window.

15. One or more non-transitory computer-readable media storing instructions which, when executed by a processor, instruct the processor to perform actions comprising:

accessing acceleration data indicating acceleration of a computing device, the acceleration data determined at least partly by at least one accelerometer that is a hardware resource;

determining rotated acceleration data, based on a rotation of the acceleration data toward each of a plurality of candidate directions;

transforming at least a portion of the rotated acceleration data to a frequency domain to determine transformed acceleration data for each of the plurality of candidate directions;

determining a peak power of the transformed acceleration data for each of the plurality of candidate directions; and designating at least one candidate direction of the plurality of candidate directions as a movement direction of a translational movement of the computing device relative to an orientation of the computing device, the designating of the at least one candidate direction based at least partly on the at least one candidate direction exhibiting a higher peak power compared to the peak power determined for other candidate directions of the plurality of candidate directions.

16. The one or more non-transitory computer-readable media of claim 15, wherein the at least one accelerometer is included in the computing device.

17. The one or more non-transitory computer-readable media of claim 15, the actions further comprising:

adjusting the acceleration data to remove a portion of the acceleration caused by a gravitational field.

18. The one or more non-transitory computer-readable media of claim 15, the actions further comprising:

applying a smoothing function to the rotated acceleration data prior to the transforming.

19. The one or more non-transitory computer-readable media of claim 15, the actions further comprising:

accessing orientation data generated by a magnetometer of the computing device, the orientation data indicating a gross orientation of the computing device relative to a geomagnetic field; and combining the movement direction with the gross orientation of the computing device to determine a gross movement direction of the computing device relative to the geomagnetic field.

20. The one or more non-transitory computer-readable media of claim 15, wherein:

the acceleration data indicates the acceleration of the computing device within a plane;

the plurality of candidate directions are separated by a predetermined angular distance; and an arc including the plurality of candidate directions is at least 180 degrees within the plane.

* * * * *